April 28, 1964   C. A. VAN STAADEN   3,131,389
GATING SYSTEM WITH VARIABLE DELAY
Filed Nov. 18, 1958   2 Sheets-Sheet 1

INVENTOR.
CORNELIS AUGUSTINUS VAN STAADEN
BY
ATTORNEY.

United States Patent Office 3,131,389
Patented Apr. 28, 1964

3,131,389
GATING SYSTEM WITH VARIABLE DELAY
Cornelis A. van Staaden, Hengelo, Netherlands, assignor to N.V. Hollandse Signaalapparaten, Hengelo, Overijssel, Netherlands, a Dutch corporation
Filed Nov. 18, 1958, Ser. No. 774,638
Claims priority, application Netherlands Nov. 19, 1957
18 Claims. (Cl. 343—7.3)

This invention relates to a gating system, provided with a generator for recurrent synchronizing pulses, and a delay circuit with adjustable delay receiving the said pulses and reacting to such a pulse by causing a signal to be given to a gating pulse generator system after an adjustable delay has elapsed with the result that this system produces two successive gating pulses for every signal, the first gating pulse controlling a first gating circuit so as to make it temporarily conductive, and the second gating pulse controlling a second gating circuit in the same way, both gating circuits having a common input circuit through which recurrent pulses, separated from the synchronizing pulses by an interval determined outside the gating system, are applied to this system, the output circuits of the gating circuits being connected to an integrating system providing a control voltage which regulates the delay in the delay circuit and is dependent on the charges passing through the gating circuits in such a way that its changes tend to synchronize the gating pulses with the recurrent pulses applied to the system.

This type of system is generally used as a gating system in radar apparatus. When the coincidence of gating and echo pulses has been achieved, such gating systems are, as a rule, capable of automatically maintaining the coincidence of the gating pulses and the echo pulses, notwithstanding the fact that the range of the target may be changing.

Before the range autofollow operation can start, however, the gating pulses must be brought into coincidence with the echo pulses. For this purpose the gating system is as a rule provided with a manually operated regulating device for the delay between the synchronnizing pulses and the gating pulses. During this manually operated control of the delay of the gating pulses, these pulses are observed on the screen of a cathode tube display. Generally an A-scope is applied for this purpose. On such a scope the range is shown along a straight or circular time base. In order to permit the comparison of the moment of occurrence of echo pulses and gating pulses, both types of pulses cause a deflection of the cathode ray in a direction traverse to the direction of the time base line.

It is desirable for the gating pulses to be short, in order to reduce noise and to reject all undesirable echoes and to permit accurate range measurements as well as faultless operation of the direction autofollow system. The shortness of the gating pulses hampers, however, the manually controlled synchronization of echo and gating pulses, especially because preferably the automatic regulation of the delay is switched off during hand-controlled synchronization in order to prevent the system from locking to the first echo met during the searching operation, the gating pulses in this case being prevented from locking to the desired echo as well.

It would be possible to facilitate the manually controlled synchronization of the gating pulses by temporarily applying gating pulses of longer duration. This would, however, require complicated circuits. Generally in gating pulse circuits the first gating pulse is initiated by a pulse derived from the synchronizing or trigger pulse by means of a time modulator, causing the former pulse to be delayed with respect to the latter.

In modern gating systems the second gating pulse is initiated by the trailing edge of the first one, causing in this way the front edge of the second gating pulse to coincide more or less with the trailing edge of the first one. The said common or coinciding edges are separated from the time modulator pulse which initiates the first gating pulse by an interval which is equal to the duration of the first gating pulse. Changing the duration of the gating pulses does not influence the moment of occurrence of the time modulator pulse. Consequently the switch-over from broad to narrow gating pulses causes the moment of occurrence of the coinciding edges of the gating pulses to be shifted in time. In the synchronized state of the system both gating pulses overlap the echo pulse, so that the coinciding edges occur during the reception of the echo pulse, and if the synchronization has been effected by means of broad gating pulses, the common edges of these broad pulses occur during the echo pulse. When the switch-over to narrow gating pulses causes the moment of occurrence of the common edges to be shifted, these common edges will no longer coincide with the echo pulses, and, as the duration of the broad pulses is a multiple of the duration of the narrow pulses, even the second narrow gating pulse will no longer overlap the echo pulse after the switch-over. Consequently the switch-over would cause the synchronization to become completely lost, and, as the echo pulses would no longer be able to pass through the gating circuits, no automatic control of the delay of the gating pulses would occur after this switch-over.

A gating pulse system of the type described above could only be successfully applied if complicated means were used which would permit a reduction of the duration of the gating pulses without changing the moment of occurrence of the common edges of these pulses. In this way only would a synchronization, established with broad gating pulses, continue after the switch-over to narrow gating pulses. It is the object of the invention to meet the above objections without complicated auxiliary circuits being used. According to the invention the gating system can be brought into a condition in which only the second of the two successive gating pulses is lengthened. In such a system it is easy to cause the lengthened second gating pulse to overlap the desired echo pulse. If at that moment the automatic control of the delay is made operative this control will cause both gating pulses to overlap the echo pulse by suitably regulating the delay in the time modulator.

A very effective method for a rapid synchronization of gating pulses and echo pulses by means of a lengthened second gating pulse operates in the following way. By means of a hand controlled device and a suitable scope the delay of the still unlengthened gating pulses is adjusted so as to cause the gating pulses to occur immediately before the echo pulses with such a short difference in time that if the second gating pulse is lengthened it may be expected to overlap the echo pulses. A switch-over is then made to a lengthened second gating pulse whilst the automatic regulation of the delay is operative. The pulses are then automatically synchronized with the echo pulses by the automatic control, after which the system is switched back to short gating pulses and automatic control of the delay of the gating pulses. For this purpose the system should preferably be able to operate in three modes:

(1) A mode in which the gating pulses are narrow but the automatic control of the delay of the gating pulses is switched off;

(2) A mode in which the second gating pulse is lengthened and the automatic control of the delay of the gating pulses is operative;

(3) A mode in which the gating pulses are narrow and the automatic control of the delay is operative.

The latter mode is the normal way of operation. It may be advantageous during this mode for the manual control of the delay to be switched off so that the automatic control will not be disturbed by accidental operation of the manual control. The switching back to narrow gating pulses may be effected automatically. In an embodiment according to the invention the switch back to narrow gating pulses is effected by a delayed device, the delay of which is with certainty longer than the interval required for the synchronization of gating and echo pulses and which is made operative by the switch-over to lengthened second gating pulses. In gating pulse circuits of the type described above the gating pulses are usually produced by blocking oscillators, because these oscillators are able to generate very narrow pulses with very steep edges. These blocking oscillators are, however, less suitable for producing pulses of longer duration. If, on the other hand, a normal flip-flop circuit were used for generating the lengthened second gating pulse this second gating pulse would not show the required steep edges. Although no steep trailing edge is required for the second gating pulse a steep front edge is very desirable. If the front edge of this second pulse were not steep there would be a period between first and second gating pulse during which neither of the two gating circuits would be completely conductive. This is highly undesirable, because especially during this period echo pulses must flow through the gating circuits to the control circuit for the directional autofollow system and the AVC system. According to the invention this objection is met by causing a flip-flop circuit to cooperate with a blocking oscillator in producing the lengthened second gating pulse, the flip-flop circuit and the blocking oscillator being triggered at the same or nearly at the same moment, and the second gating pulse lasting till both circuits have returned to their state of rest. The steep front edge of the lengthened second gating pulse is in this case provided by the blocking oscillator, whilst the trailing part of the pulse is generated by the flip-flop circuit.

The invention will now be described in greater detail with reference to the drawings.

Figure 1:
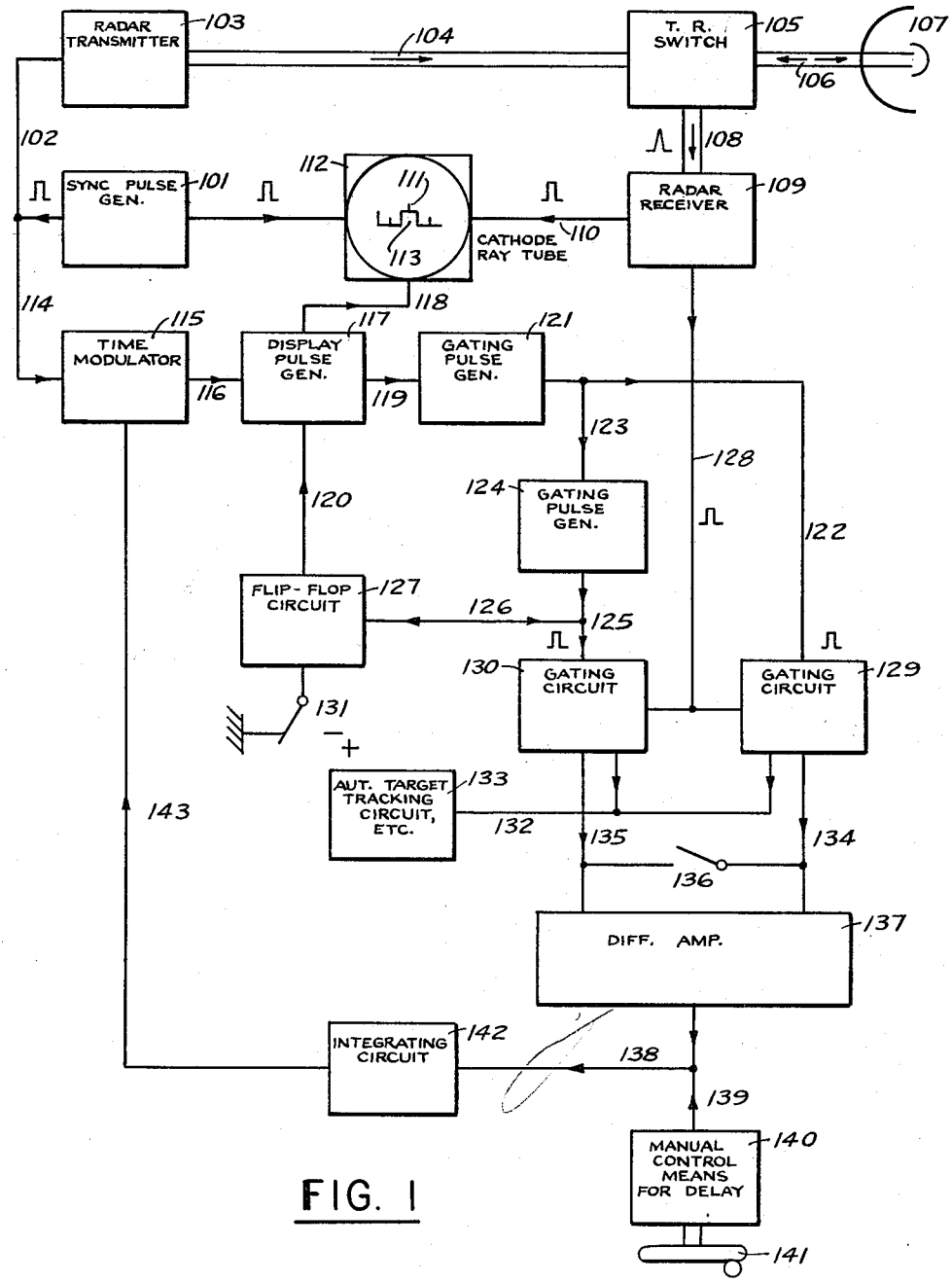
FIG. 1 shows a block circuit of a radar apparatus in which a gating pulse circuit according to the invention is applied.

A synchronizing pulse generator 101 in FIG. 1 delivers synchronizing pulses to a transmitter 103 by way of conductor 102 as well as control pulses to a time modulator 115 by way of conductor 114. The transmitter 103 reacts to such a pulse by producing a pulse of high frequency energy, which is delivered to the aerial 107 via the wave guide 104, the TR switch 105 and the wave guide 106, causing the aerial to emit a narrow beam of high frequency energy during a very short period. During this transmission the TR switch blocks the input circuit of the receiver 109 which will, therefore, not be damaged by the transmitter energy. Echo pulses are returned to the aerial 107, and are conveyed by the wave guide 106 to the TR switch 105, which at this moment does not block the receiver input circuit and delivers these echo pulses to the receiver 109 by way of the wave guide 108. The receiver transforms these pulses in a way well known in the art into video pulses. The video pulses are applied by way of the line 110 to an A-scope 112 and by way of the line 128 to the gating circuits 129, 130. When the time modulator 115 has received a synchronizing pulse, and adjustable delay has elapsed since the reception thereof, it produces a time modulated signal. The said delay is determined by a control voltage applied to the time modulator 115 via the line 143. The time modulator may be a saw tooth voltage generator which is triggered by the synchronizing pulses, and after being triggered, produces a saw tooth voltage which is compared with the control voltage in the line 143. As soon as the saw tooth voltage exceeds the control voltage, a diode becomes conductive, and the front edge of the pulse which at that moment starts in the diode circuit is applied to initiate the pulse forming the signal with adjustable delay. The length of the delay is regulated by changing the control voltage.

A monostable trigger circuit or flip-flop circuit may also be used as a time modulator. The synchronizing pulses provided by generator 101 cause this flip-flop circuit to leave its stable state. It then remains in its unstable state during an interval determined by the magnitude of a control voltage in the circuit 143. The trigger circuit or the flip-flop circuit in this way generates a pulse with adjustable duration, starting at the receipt of the synchronizing pulse and having a duration which is determined by the control voltage. The trailing edge of the pulse with adjustable duration forms the signal with adjustable delay furnished to the gating pulse system. The signals formed by the pulses with adjustable delay produced by the time modulator are applied to the display pulse circuit 117. The display pulse circuit reacts to these signals by producing display pulses, the duration of which is somewhat longer than the sum of the durations of the two successive gating pulses. The display pulses flow via line 118 to the cathode ray tube of the A-scope and there cause a deflection of the cathode ray of this tube in a direction transverse to the scanning direction, thus showing the moment of occurrence of the gating pulses.

The display pulse is, moreover, applied to the first blocking oscillator 121 via a delay network which causes a slight delay. This blocking oscillator is triggered by the presence of the voltage corresponding to the display pulse, causing it to produce a short gating pulse, and to provide this pulse to the gating circuit 129. The first gating pulse is also applied to the second gating pulse generator 124, in which it is differentiated, so that short pulses are derived from its front and trailing edges. The polarity of the pulse occurring at the trailing edge is such that it triggers the blocking oscillator in the second gating pulse generator circuit 124, causing this oscillator to apply a short gating pulse to the second gating circuit 130. The two gating pulses cause the gating circuits 129 and 130 to become successively conductive during a very short interval. The duration of the delay of the display pulse caused by the delay network when this pulse is applied to the first blocking oscillator is such that the two gating pulses are substantially symmetrically situated with respect to the display pulse. The video pulses, derived from the received echo pulses by the receiver 109 are applied to the gating circuits by way of the line 128. If both gating pulses overlap the said video pulses, a part of every video pulse will pass the gate 129, the remaining part of it passing the gate 130. The two gating circuits form the input circuits for integrating circuits. The voltages at these integrating circuits are determined by the parts of the video pulses which will be able to reach the integrating circuits through the corresponding gating circuits. For instance the voltages at the two integrating circuits will be equal if one half of a video pulse passes through one gating circuit and the second half of the video pulse passes through the other gating circuit. If the common edges of the two gating pulses do not coincide with the centre of the video pulses, a difference builds up between the voltages at the integrating circuits. This difference in voltage controls, via the lines 134 and 135, a differential amplifier 137, which then applies an output voltage to the line 138. Its magnitude is determined by the magnitude of the difference of the integrator voltages, and its polarity is determined by the sign of the difference of the said integrator voltages. The output voltage of the differential amplifier, which will become larger in accordance with the increase in difference between the moment of occurrence of the gating pulses and the correct moment of occurrence with respect to the moment of occurrence of the video pulses, is introduced into an integrating circuit 142, integrating with respect to time. The output voltage of this integrating circuit is the control voltage for the time modulator, and is applied to this time modulator by way of the line 143, and in this way controls the moment of occurrence of the gating pulses. If the moment of occurrence of the gating pulses is correct, the differential amplifier 137 does not produce any output voltage, and the integration result provided by the integrating circuit 142 as well as the moment of occurrence of the gating pulses remains unchanged. If the gating pulses are delayed with respect to the video pulses the polarity of the voltage applied to the integrating circuit 142 by the differential amplifier 137 is such that the change of the output voltage of the integrating circuit resulting from it causes the gating pulses to be generated earlier. A similar operation occurs when the video pulses are delayed with respect to the gating pulses. The voltage produced by the integrating device 142 can also be influenced by means of a handwheel 141 of the device 140. If the handweel is in the position of rest, the device 140 does not produce any output voltage and consequently does not influence the integration result of the integrating device 142. If the handwheel is rotated out of its position of rest, the device 140 produces a voltage in the circuit 139. The polarity of this voltage is determined by the direction of rotation of the handwheel from its position of rest and its magnitude by the magnitude of the said rotation. This voltage is integrated by the integrating device and thus causes a change in the moment of occurrence of the gating pulses. The control of the gating pulses by means of the handwheel 141 is as a rule only used in order to synchronize the gating pulses with the echo pulses of the target to be observed. Preferably the autofollow action of the gating pulses is switched off during this manual control because otherwise the gating pulses would lock onto the first echo pulse met during the manual control operation, and this echo pulse would probably be provided by the wrong target. The autofollow action is switched off by means of contact 136 which short-circuits the input circuit of the differential amplifier 137, causing the input voltage of this differential amplifier to remain zero in spite of any voltage difference resulting from video pulses passing through the gating circuits. Lengthened second gating pulses can be provided by the monostable trigger crcuit or flip-flop circuit 127. This circuit is made operative by reversing the contact switch 131, causing anode voltages to be provided to the tubes of the flip-flop circuit. The second gating pulse, generated by the blocking oscillator 124, is applied to the flip-flop circuit 127 via the line 126. The line 126 may for this purpose be connected to the anode of the normally conductive tube in the flip-flop circuit; consequently it also influences the voltage of the grid of the normally non conductive tube of this flip-flop circuit. As soon as the positive gating pulse is received, the grid of the normally non conductive tube becomes positive and this tube conductive, whilst the normally conductive tube becomes non conductive. This causes the increased voltage at the anode of the normally conductive tube resulting from the operation of the blocking oscillator 124 to be maintained as long as the flip-flop circuit remains in its non stable state, so that during this interval a voltage of the same polarity as the gating pulses provided by the blocking oscillator 124 is applied to the line 126. This results in lengthened second gating pulses being provided to the gating circuit 130.

It would also be possible to differentiate the first gating pulse and to trigger the flip-flop circuit by the pulse derived from the trailing edge of the first gating pulse. One of the anode circuits of the flip-flop circuit must then be connected to the output circuit of the second gating pulse generator, whilst there must also be a connection between the flip-flop circuit and the output circuit of the first gating pulse generator.

The pulses produced by the flip-flop circuit are also applied to the display pulse circuit 117, causing this circuit to continue its display pulse for as long as the pulse from the flip-flop circuit lasts.

It would be possible to operate the contacts 131 and 136 by means of separate manual control devices. In a particularly effective embodiment, however, the handwheel 141 for manually controlling the moment of occurrence of the gating pulses can be shifted in axial direction for the purpose of controlling the said contacts. Preferably this handwheel has three axial positions. If the handwheel is shifted in one direction from its position of rest, for instance outwardly, the contact 136 is closed, causing the range autofollow of the gating pulses to be switched off, the handwheel in this position being coupled to a voltage divider in such a way that a slight diversion from its position of rest causes the voltage divider to provide relatively high voltages to the line 139. In this way non-lengthened gating pulses may be quickly brought into the vicinity of the echo of a target to be followed without disturbance caused by the presence of other echoes. If the handwheel is shifted in the other direction, for instance inwardly, the contact 136 is opened and the contact 131 switched over. The range autofollow system for the gating pulses is then operative and the second gating pulse is lengthened. At the same time in this position the handwheel 141 is coupled to the voltage divider in such a way that a relatively large rotation of the handwheel only causes small control voltages in the line 139, so that a fine adjustment of the moment of occurrence of the lengthened gating pulse can be effected by rotating the handwheel. If the quick adjustment of the non-lengthened gating pulses without autofollow operation has reduced the difference in moment of occurrence between the gating and the echo pulses to such an extent that after the lengthening of the second gating pulse this pulse overlaps the echo pulse, then it is only necessary to shift the handwheel in order to cause the autofollow system to effect a complete synchronization. If on the other hand the lengthened gating pulse still does not overlap the echo pulse, then a final adjustment can be made by means of the handwheel 141, after which the automatic range-following system will effect the complete synchronization. If the handwheel is in its axially central position, the contacts 136 and 131 are in the positions shown in FIG. 1. The second gating pulse is not lengthened in this case and the range autofollow system is operative. Preferably the connection between the handwheel and the voltage divider is interrupted in this position so as to prevent any disturbance of the autofollow operation by manual control. As soon as the gating pulses are synchronized with the echo pulses, these pulses are applied, by means of the switch 131, to a device 133, in which these pulses may be used for various purposes, for instance for controlling directional autofollow of a target by means of the aerial 107. Switching back from a state in which the second rating pulse is lengthened to a state in which a second gating pulse of normal duration is used can also be effected automatically after the synchronization has been effected. It is preferable in this case that the interval during which the second gating pulse is lengthened should be determined by a delayed switching device, which, the presence of video pulses in the line 132 having been established, causes the pulse lengthening circuit 127 to be switched off after an interval sufficient for the synchronization of gating and echo pulses has elapsed. During the operation with lengthened second gating pulses the blocking oscillator 124 seems to be superfluous, because the flip-flop circuit and the blocking oscillator start their pulses at the same moment. All the same, the blocking oscillator 124 cannot be dispensed with. In order to obtain a perfect regulation of the delay of the gating pulses and a perfect synchronization of these pulses with the video pulses the front edge of the second gating pulse must be very steep and must coincide with a steep trailing edge of the first gating pulse. For this reason blocking oscillators are used for providing the gating pulses, for only blocking oscillators are able to provide pulses with the required steep front edges. The edges of the pulses provided by a flip-flop circuit are far less steep. If the lengthened second gating pulse were generated by the flop-flop circuit only and the blocking oscillator 124 were switched off then too long an interval would occur during which neither of the gating circuits would be completely conductive. A part of the video pulse would then find both gating circuits more or less closed and would not be able to reach the integrating circuits. This is highly undesirable because the video pulses passing through the synchronized gates must be used for various control purposes. On the other hand the blocking oscillator is less suitable for producing long pulses. It is, therefore, undesirable to change the pulse length by changing the electric properties of the blocking oscillator 124. In the system described the steep front edge of the lengthened gating pulse is provided by the blocking oscillator which is capable of producing such steep edges, whilst the lengthened part of the gating pulse, which does not overlap the normal gating pulse, is provided by the flip-flop circuit, which is more suitable for producing long pulses.

Manual controlled synchronization is aided by means of the A-scope 112. On the screen of this scope a time base and a number of echo pulses are shown. One of these echo pulses, 111, coincides with the gating pulses shown at 113. The application of the display pulse circuit 117 according to the invention makes it absolutely certain that gating pulses and echo pulses shown at the same spot on the screen actually occur at the same moment.

Figure 2:
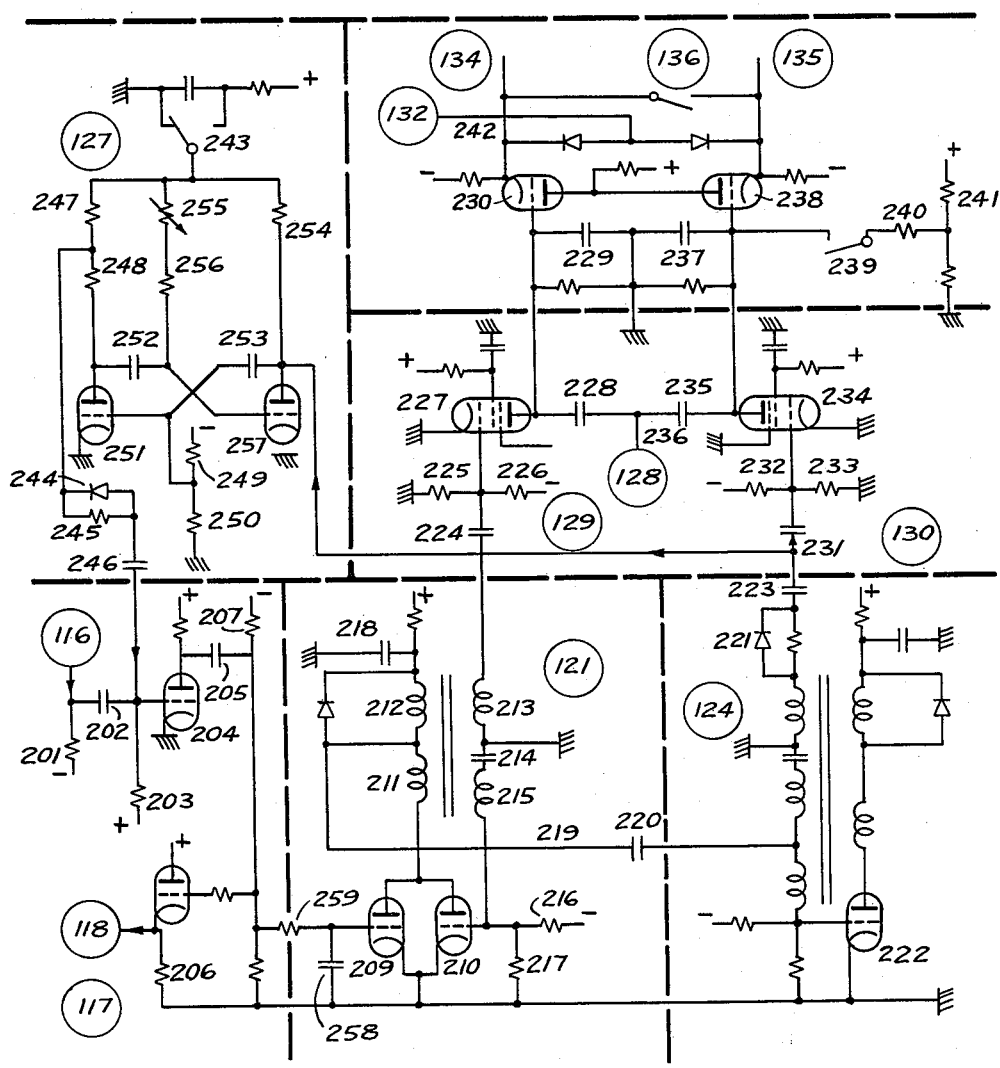
FIG. 2 shows the part of the gating pulse circuit, which is essentially influenced by the application of the invention.

The part of the circuit which is particularly important for the application of the measures according to the invention will now be described in greater detail with reference to FIG. 2. In this figure parts corresponding to parts shown in FIG. 1 have the same reference number as in FIG. 1, now, however, enclosed by a circle. Dashed lines divide FIG. 2 into parts corresponding to parts shown as rectangles in FIG. 1.

Part 117 is the display pulse circuit. Parts 121 and 124 are the two gating pulse generators, 129 and 130 are the two gating circuits, whilst 127 is the flip-flop circuit for the gating pulse lengthening. A pulse with adjustable duration, produced by the time modulator 115 of FIG. 1, is received at the terminal 116. As a result of this pulse the voltage of the terminal 116 is suddenly increased at the moment of occurrence of the synchronization pulse. This does not substantially influence the anode current of the normally conductive tube 204, but causes the condenser 202 to be charged by the grid current of the tube. At the end of the time modulator pulse the said voltage is reduced to its value of rest. Because of the charge accumulated in the condenser 202 the voltage reduction of terminal 116 results in a voltage reduction of the grid of the tube 204, making this grid negative and the tube temporarily non conductive. The negative potential of the grid of this tube does not, however, last indefinitely. The condenser 202 is charged in a circuit comprising the resistances 203 and 201, and after an interval determined by the time constant of the said circuit the normal potential of the grid of the tube 204 is sufficiently restored to make the tube conductive. The negative potential of the grid of the tube 204, caused by the removal of the signal formed by the time modulator pulse, is, however, considerably larger than would be necessary to cut off the anode current, so that this current will remain cut off until the greater part of the charge accumulated in the condenser has disappeared. The anode of the tube 204 consequently produces a rectangular positive voltage wave which is the display pulse and the duration of which is determined by the time constant of the RC circuit 203, 202, 201. The time constant of this circuit is such that the duration of the display pulse produced by the tube 204 is slightly larger than the sum of the durations of the two gating pulses. The duration of the latter pulses is determined by other time constants. The display pulse produced in the anode circuit of the tube 204 whilst this tube is cut off is applied to the grid of a cathode follower 206 by way of a large condenser 205. The cathode voltage of this latter tube, amplified if necessary, is applied as a deflection voltage to the cathode ray tube of the scope in order to display the gates on the screen of the scope. The display pulse also makes the switching tube 209 temporarily conductive, in this way causing a sudden pulse in the transformer windings 211 and 212. No current flows through these windings during the state of rest of the gating pulse generator 121 because the rest potential of the grid of this tube, as determined by the voltage divider 216, 217, is negative with respect to its cathode. As a result of this pulse in the windings 211 and 212 a voltage is induced in the windings 213 and 215, and this voltage is applied to the grid of the tube 210, causing this grid to become substantially positive with respect to the cathode. The tube then becomes conductive and remains conductive for an interval determined by the condenser 214. Whilst this tube is conductive the condenser 218 is discharged in a circuit comprising the transformer windings 212 and 211 and the tube 210. The discharge current in these transformer windings will, for the time being, be a linearly increasing function of time, and will, consequently, induce a constant voltage in the windings 213 and 215, causing the grid of the tube 210 to remain positive. The grid circuit, however, comprises a condenser 214 which is charged by the induced current, so that the voltage across its terminals will rise and eventually reduce the grid voltage of the tube 210 to such an extent that the anode current drops. The dropping of the anode current is an unstable phenomenon, because the decreasing current in the winding 211 induces a voltage in the winding 215 which causes the grid of the tube 210 to become negative, so that the anode current abruptly drops to the value of the anode current of the tube 209, which is still conducting owing to the fact that the display pulse voltage is still applied to its grid. The anode current of the tube 209 is relatively small and constant, so that it induces no voltages in the transformer windings and when it is reduced to zero at the end of the display pulse it only causes a negative voltage to be applied to the grid of the tube 210, so that the blocking oscillator is not restarted. During the operation of the circuit 121, a saw tooth current pulse will flow in the anode circuit of the tube 210, and this current induces a constant voltage pulse in the winding 213. This pulse is positive and is the first gating pulse applied to the grid of the first gating tube 227 by way of a condenser 224. Normally the anode current in the gating tube is cut off, as its grid has a negative potential provided by the voltage divider 225, 226. As long as the gating pulse lasts it makes the gating tube conductive. An RC circuit 259, 258 with a small time constant is connected between the anode circuit of the tube 204 in the display pulse circuit and the grid of the switching tube 209 in the first gating pulse generator. It causes a small delay between the front edge of the display pulse and the start of the operation of the gating pulse generator. As a result of this delay the first gating pulse starts slightly later than the display pulse. As has been shown above this delay permits the two gating pulses to be situated entirely centrally within the duration of the display pulse. The voltage pulse induced in the winding 212 is delivered to the second gating pulse generator by means of the line 219. This pulse also has a rectangular shape. It is differentiated by the condenser 220, and the grid voltage caused by the pulse derived from the trailing edge of the pulse of the first gating pulse generator causes the tube 222 in the second gating pulse generator 124 to become conductive. This tube then effects a cycle similar to that described for the first gating pulse generator. The rectangular positive pulse generated by the second gating pulse generator is applied via the condenser 231, to the grid of the second gating tube 234. This grid normally has a negative potential provided by the voltage divider 232, 233, causing this tube to be non-conductive in its state of rest. The gating tubes 227 and 234 are successively made conductive for a short interval by the two gating pulses. By means of the circuit 236 the receiver feeds video pulses to the two gating circuits. If a pulse voltage is present in this circuit whilst the gating tube 227 is conductive, the condenser 228 is charged. This condenser integrates that part of the video pulses which overlaps the pulses controlling the gating tube 227. In the same way video pulses are integrated by the condenser 235 in so far as they overlap the gating pulses for the gating tube 234. The voltages at the terminals of the condensers 228 and 235 control the cathode followers 230 and 238. Low pass networks 229 and 237 between the condensers and the cathode followers prevent the video voltages still present at the condenser terminals from reaching the grids of the cathode followers. The voltages of the cathodes of the cathode followers 230 and 238 will be equal if the centre of the video pulses coincides with the common edges of the gating pulses, whilst one of these voltages will be larger than the other if the said common edges do not coincide with the centre of the video pulse. The voltage difference is fed to a differential amplifier by way of the conductors 134 and 135, as has been described with reference to FIG. 1. The operation of this amplifier and the integrator circuit controlled by its output voltage need not be described in further detail, because it does not form part of the present invention and circuits of this type are well known in the art. Control voltages for the direction autofollow device are derived from the cathode voltages of the cathode followers by way of two rectifiers and a conductor 242. The lengthening of the second gating pulse is effected by means of the flip-flop circuit 127. Normally this circuit is switched off by the contact 243, which, in its position of rest, connects the anode circuits of the tubes of the flip-flop circuit to earth potential. When this contact is switched over, a suitable anode voltage is fed to the said circuits. When the pulse lengthening circuit is operative it returns automatically to its stable state. In this state the tube 251 is nonconductive, because its grid receives a negative potential from the voltage divider 249, 250, whilst the tube 257 is conductive, because its grid is connected to the source of positive anode voltage by means of the resistances 255 and 256. The positive pulses produced by the second gating pulse generator 124 are applied to the grid of the tube 251 via the condenser 253, causing this tube to become conductive. The anode current then causes an anode voltage drop in the anode resistance 247, 248, which is applied by way of condenser 252 to the grid of the tube 257, causing this tube to become non-conductive. The circuit remains in this state until condenser 252 is charged in a circuit via resistances 255 and 256 to an extent sufficient to change the negative grid potential of tube 257 sufficiently for this tube to become conductive again. When tube 257 becomes conductive, the anode voltage decreases, and this voltage drop is applied to the grid of the tube 251 by way of the condenser 253, causing the tube 251 to become non-conductive again. The circuit has then returned to its stable state. As has been described above the tube 257 becomes non-conductive directly after the start of the second gating pulse produced by the blocking oscillator 124. This causes an increase in its anode voltage, which is applied to the grid circuit of the gating tube 234. This gating tube, consequently, remains conductive as long as the tube 257 remains non-conductive. On the other hand the tube 251 is conductive as long as the flip-flop circuit is in its non-stable state, and when this tube is conductive the potential of the connecting point of the resistances 247 and 248 is decreased. By way of resistor 246 and the rectifier 244, which is conductive for this voltage direction, the decreased voltage is applied to the grid circuit of the tube 204, causing this tube to remain non-conductive as long as the flip-flop circuit remains in its non-stable state, i.e. as long as the lengthened second gating pulse lasts. The voltage increase at the anode of the tube 204, resulting from its non-conductivity, controls the grid circuit of the cathode follower 206, causing the pulses emitted by this cathode follower to the A-scope by way of conductor 118 to be lengthened to the same extent as the gating pulses. By making the flip-flop circuit 127 operative the gating pulses of the second gating circuit as well as the pulses provided to the A-scope are thus lengthened to the same extent. The rectifier 244 prevents the pulses produced by the time modulator from influencing the flip-flop circuit and bringing it to its non-stable state.

Special measures must be taken to prevent a rapid drift of the gating pulses as a result of noise, when a radar apparatus is operated with lengthened second gating pulses and no echoes are received. If no video pulses pass through the gating circuits the condensers 228 and 235 will still be charged by noise voltages, and the voltages across their terminals will not correspond to the value of rest. The voltage across such a condenser is determined by the duration of the gating pulse of the relevant gating circuit and by the noise level. As a result of the operation of the automatic volume control the noise level has a predetermined value if no echoes are received. The condensers will consequently be charged to a predetermined constant voltage. These voltages will not, as a rule, be equal. It may be assumed that the noise level will be the same during successive gating pulses, but all the same the voltages across the condensers will show a constant difference due to the fact that the duration of the two gating pulses will not be completely equal. Without special measures this voltage difference would control the differential amplifier and cause a slow change in the moment of occurrence of the gating pulses, so that these pulses would eventually occur either at the beginning or at the end of the range of the gating system. This phenomenon, called drift of the gating pulses, which also may be observed in radar systems operating with non-lengthened gating pulses, is highly undesirable. It is obviated by providing a suitable unsymmetry in the circuit which opposes the influence of the difference of the integrator voltages caused by the noise energy. Such an unsymmetry can for instance be realized by providing unequal grid bias to the tubes in the differential amplifier or to other tubes situated in corresponding parts of the circuits beyond the two gating circuits or by inserting a source of constant voltage in the output circuit of the differential amplifier. The state of equilibrium introduced by this unsymmetry is, however, immediately and violently disturbed as soon as the second gating pulse is lengthened. The condenser 235, charged by way of the second gating tube, will then receive the noise voltages during a substantially longer period and will, therefore, be charged to a substantially higher voltage than the condenser 228 pertaining to the first gating circuit. Consequently, after the switch-over to a lengthened second gating pulse the moment of occurrence of the gating pulses will change rapidly, although during the operation with unlengthened gating pulses no drift occurred. The delay between gating and synchronizing pulses is then adjusted to the highest value possible in the apparatus, which is undesirable.

During the operation with lengthened second gating pulses the difference between the voltages to which the integrator condensers are charged will be constant also for the same reason already elucidated above in connection with unlengthened gating pulses so that the undesirable influence of this voltage difference can also be opposed by means of a constant unsymmetry of the circuits during operation with lengthened second gating pulses. It is obvious that this unsymmetry should have a value other than the value of the unsymmetry applied in order to prevent drift caused by small divergences of substantially equal gating pulses. Consequently, when the apparatus for lengthening the second gating pulse is made operative measures to apply or change an unsymmetry in the circuits must be taken. For this purpose a switchover is effected either in the gating circuits or in the part of the system situated beyond these gating circuits establishing an unsymmetry such that the drift resulting from the lengthening of the second gating pulse is substantially compensated for. In the embodiment described this is effected in the following way. The voltages across the terminals of the condenser 228 and 235 are supplied to a differential amplifier by way of cathode followers 230 and 238. Gating circuits and cathode follower circuits are symmetric as long as no gating pulse lengthening is applied. The slight drift which might occur as a result of small differences between the first gating pulse and the unlengthened second gating pulse is compensated for in the output circuit of the differential amplifier. As soon as the system is switched over to lengthened second gating pulses by means of the contact 243, which makes the flip-flop circuit providing the lengthened second gating pulse operative, the contact 239 is also switched over. This contact disturbs the symmetry of the cathode follower circuits by connecting the grid circuit of one of the cathode followers via a resistance 240 to a point of adjustable potential of the voltage divider 241. The said adjustable potential has been so adjusted that drift during the absence of echoes and operation with lengthened second gating pulses is substantially compensated for. It is obvious that any other means for decreasing the drift could be applied for this purpose provided that they are made effective at the moment of the switch over to lengthened second gating pulses. If the drift occurring with unlengthened and lengthened gating pulses is compensated for by the same means the switching over operation will only have to change the compensation, e.g. by changing a grid voltage or other compensation voltage such as the compensation voltage in the output circuit of the differential amplifier.

The invention is described for a system in which the lengthened gating pulse is generated by the cooperation of a normal gating pulse generator and an auxiliary circuit which provides the lengthened part of the gating pulse. This method has various advantages elucidated above. It is obvious however that in principle use can also be made of circuits comprising a device which is itself able to produce the complete lengthened second gating pulse; in this case either the said device can be switched over and is also able to provide the unlengthened gating pulse, or the gating system is provided with a second gating pulse generator suitable for providing short gating pulses, one or the other of the gating pulse generators being made operative as required.

In the embodiment described above, the voltage controlling the time modulator is provided by an electronically controlled integrating circuit. It is obvious that the invention may also be applied in a system in which this voltage is provided by a mechanically driven voltage divider, the driving motor of which is controlled by the output voltage of the differential amplifier.

What is claimed is:

1. In a gating system, in combination, a time modulator circuit having an adjustable delay circuit means, a generator for recurrent synchronizing pulses connected to said time modulator circuit for feeding said synchronizing pulses to the modulator circuit, means in said time modulator circuit generating in response to each synchronizing pulse an electric signal after an adjusted delay, a gating pulse generating system, a circuit connection between said system and said time modulator, the signal generated by the time modulator being applied to said connection, means in the gating pulse generating system which in response to each signal applied to said connection generate two successive gating pulses of fixed duration, a first and a second gating circuit to which recurrent pulses, received from outside the system, are applied, a circuit connection for feeding the first of two successive gating pulses to the first gating circuit which in response to a coinciding first gating pulse and received recurrent pulse permits passage of an overlapping part of the latter pulse to the output circuit of the first gating circuit, a circuit connection for feeding the second of two successive gating pulses to the second gating circuit which in response to a coinciding second gating pulse and a received recurrent pulse permits passage of an overlapping part of the latter pulse to the output circuit of the second gating circuit, a circuit means integrating with respect to time, circuit connections between said circuit means and the output circuits of the two gating circuits, means in said circuit connections for causing the output voltage of the integrating circuit means to be varied in magnitude according to the changes in the difference of the energy content between the parts of the pulses passing through the one of the two gating circuits and the parts of the pulses passing through the other of the two gating circuits, a circuit connection between the integrating circuit means and the time modulator circuit for applying an output voltage of the integrating circuit means to the time modulator circuit, means in said modulator circuit for changing the delay in the time modulator circuit in accordance with the output voltage of the integrating circuit means, first switching means for rendering the part of the circuit comprising the gating circuits and the integrating circuit means inoperative to control the delay in the time modulator circuit, means for manually controlling the said delay, a display system comprising a cathode ray tube including beam deflecting means and a time base generator synchronized by the synchronizing pulses and controlling the beam deflecting means to produce a deflection for the electron beam for causing a time-base scanning motion of the cathode ray upon each reception of a synchronizing pulse by the gating system, means for controlling the electron beam to which the recurrent received pulses are also applied, and which in response to such pulses change the electron beam, means for generating pulses substantially corresponding in duration and moment of occurrence to the sum of the gating pulses, and for applying said pulses to the means for controlling the electron beam, said beam controlling means in response to said pulses changing the electron beam, and second switching means operating independently of the first switching means and capable of changing the duration of the second gating pulse so as to make the duration of said pulse substantially longer than that of the first gating pulse.

2. In a system according to claim 1, wherein said manually controlled switching means comprises first elements for changing the operating condition of the gating pulse generating system to cause the second gating pulse to be either of a duration which does not differ substantially from that of the first one or of a substantially longer duration, second switching means connecting the circuit for changing the delay in the time modulator circuit to maintain automatically the synchronism of gating pulses and recurrent received pulses, to be in or out of operation, and a manually controllable third switching means for setting the rate of change of the delay of the time modulator circuit caused by the manual delay control means at one of two possible values, said third switching means being arranged for setting the switching elements for the following operating conditions of the system:

(1) the difference in the durations of the gating pulses is small or zero, and the circuit for automatically maintaining the synchronism is operative, (2) the second gating pulse has a substantially longer duration than the first one, the circuit for automatically maintaining the synchronism is operative, and the rate of change of the delay in the time modulator circuit caused by the manual delay control is low, (3) the second gating pulse has a substantially longer duration than the first one, the circuit for automatically maintaining the synchronism is non-operative and the rate of change of the delay in the time modulator circuit caused by the manual delay control is high.

3. In a system according to claim 1, wherein said manually controlled switching means comprises first elements for changing the operating conditions of the gating pulse generating system to cause the second gating pulse to be either of a duration which does not differ substantially from that of the first one, or of a duration substantially longer than that of the first one, second switching elements for causing the circuit for automatically maintaining the synchronism of gating pulses and recurrent received pulses to be operative or inoperative, and manually controllable third switching elements for setting the rate of change of the delay of the time modulator caused by the manual delay control means at a high, low or zero value, said third switching means being arranged for setting the switching elements for the following operating conditions of the system:

(1) the duration of the second gating pulse does not substantially differ from that of the first one, the said circuit for automatically maintaining the synchronism is operative, and the rate of change of the delay caused by the manual control is maintained at zero value.

(2) the second gating pulse has a substantially longer duration than the first one, the circuit for automatically maintaining the synchronism is operative and the rate of change of the delay caused by the manual delay control is low, (3) the second gating pulse has a substantially longer duration than the first one, the circuit for automatically maintaining the synchronism is non-operative, and the rate of change of the delay caused by the manual delay caused by the manual delay control is high.

4. In a system according to claim 3, wherein said manual means includes a handwheel rotatable about its axis and axially shiftable, rotation of said wheel controlling the delay in the time modulator, and axial shifting controlling the switching elements of the manually controlled switching means.

5. In a system according to claim 1, a control means for the second switching means and a connection between at least one of the output circuits of the gating circuits and the said control means, and means in the said control means responsive to the voltage applied to the said connection when energy below a certain level is present in an output circuit of a gating circuit, the output circuit of which is connected to the said control means, by causing the second switching means to change the duration of the second gating pulse to make it substantially longer than that of the first gating pulse.

6. In a system according to claim 1, a control means for the second switching means and a connection between at least one of the output circuits of the gating circuits and the said control means, and means in the said control means responsive to voltages applied to the said connection by the one output circuit when energy above a certain level is present therein, by causing the second switching means to change the duration of the second gating pulse to its shortest value.

7. In a system according to claim 1, including means for changing the rate of change of the delay in the time modulator caused by the manual delay control, and manually controlled apparatus for setting said rate changing means and the first and second switching means for the following operating conditions of the system:

(1) the duration of the second gating pulse is small, and the part of the circuit comprising the gating circuits and the integrating circuit means is operative to control the delay in the time modulator circuit, (2) the second gating pulse has a substantially longer duration than the first one, the part of the circuit comprising the gating circuits and the integrating circuit means is operative to control the delay in the time modulator circuit, and the rate of change of the delay in the time modulator circuit caused by the manual delay control is low, (3) the second gating pulse has its shortest duration, the part of the circuit comprising the gating circuits and the integrating circuit means is inoperative to control the delay in the time modulator circuit, and the rate of change of the delay in the time modulator circuit caused by the manual delay control is high.

8. In a system according to claim 1, including means for changing the rate of change in the delay of the time modulator caused by the means for manually controlling the said delay, manually controlled apparatus for setting the said rate changing means and the first and second switching means for the following operating conditions of the system:

(1) the duration of the second gating pulse is small, the part of the circuit comprising the gating circuits and the integrating circuit means is operative to control the delay of the time modulator circuit, and the rate of change of the delay in the time modulator circuit caused by the manual delay control is zero, (2) the second gating pulse has a substantially longer duration than the first one, the part of the circuit comprising the gating circuits and the integrating circuit means is operative to control the delay in the time modulator circuit, and the rate of change of the delay in the time modulator circuit caused by the manual delay control is low, (3) the second gating pulse has a short duration, the part of the circuit comprising the gating circuits and the integrating circuit means is inoperative to control the delay in the time modulator circuit, and the rate of change of the delay in the time modulator circuit caused by the manual delay control is high.

9. In a system according to claim 7, including a handwheel rotatable about its axis and axially shiftable setting by its rotation the means for manually controlling the delay in the time modulator, and setting by its shifting motion the manually controlled apparatus for setting the rate change means and the first and second switching means.

10. In a system according to claim 1, blocking oscillator means in the gating pulse generating system and supplying the second of the two successive gating pulses, mono-stable trigger circuit means made operative by the second switching means for lengthening the second gating pulse and comprising a control circuit for bringing it into its non-stable condition and an output circuit, a connection between said output circuit and the circuit conneciton for feeding the gating pulses to the second gating circuit through which the mono-stable trigger circuit applies a voltage to the second gating circuit causing it to pass received recurrent pulses when it is in its non-stable condition, and a connection between the control circuit and the circuit connection feeding the second gating pulse to the second gating circuit.

11. In a system according to claim 1, blocking oscillator means in the gating pulse generating system and supplying the second of two successive gating pulses, monostable trigger circuit means made operative by the second switching means for lengthening the second gating pulse and comprising a control circuit for bringing it into its non-stable condition and an output circuit, a connection between said output circuit and the circuit connection for feeding gating pulses to the second gating circuit through which the mono-stable trigger circuit applies a voltage to the second gating circuit causing it to pass received recurrent pulses when it is in the non-stable condition, a connection between the control circuit of the mono-stable trigger circuit means and the circuit connection for feeding the second gating pulse to the second gating circuit, differentiating circuit means in the last-named connection for feeding a pulse of a direction causing the mono-stable trigger circuit means to assume a non-stable condition at the occurrence of the leading edge of a pulse in the said circuit connection.

12. In a system according to claim 1, blocking oscillator means in the gating pulse generating system and supplying the second of two successive gating pulses, monostable trigger circuit means made operative by the second switching means for lengthening the second gating pulse and comprising a control circuit for bringing it into its non-stable condition and an output circuit, a connection between said output circuit and the circuit connection for feeding gating pulses to the second gating circuit through which the mono-stable trigger circuit applies a voltage to the second gating circuit causing it to pass received recurrent pulses, a connection between the control circuit of the mono-stable trigger circuit arrangement and the circuit connection for feeding gating pulses to the first gating circuit, and differentiating circuit means in the said connection supplying a pulse causing the mono-stable trigger circuit arrangement to assume its non-stable condition at the occurrence of the trailing edge of a gating pulse in the said circuit connection.

13. In a system according to claim 1, a blocking oscillator in the gating pulse generating system and supplying the second of two successive gating pulses, a mono-stable trigger circuit made operative by the second switching means for lengthening the second gating pulse comprising a first electronic device with an output circuit carrying a high current in the stable condition of the trigger circuit, and a low or zero current in the non-stable condition of the trigger circuit and a control electrode controlling the current in this output circuit, and a second electronic device with an output circuit carrying a low or zero current in the stable condition of the trigger circuit and a high current in the non-stable condition of the trigger circuit and a control electrode for controlling the current in the output circuit, a resistance in the output circuit of each of said electronic devices, a connection comprising a series condenser between a tap of the resistance in the output circuit of one of the electronic devices and the control electrode of the other electronic device, and the connection between a tap of the resistance in the said output circuit and the circuit connection for feeding the second of two successive gating pulses to the second gating circuit.

14. In a system according to claim 1, a blocking oscillator in the gating pulse generating system and supplying the second of two successive gating pulses, a monostable trigger circuit means made operative by the second switching means for lengthening the second of two successive gating pulses comprising a first grid controlled electron tube carrying a high current in the stable condition of the arrangement and a low or zero current in the non-stable condition of the arrangement, and a second grid controlled electron tube carrying a low or a zero current in the stable condition of the arrangement and a high current in the non-stable condition of the arrangement, a resistance in the anode circuit of each of the said electron tubes, a connection comprising a series condenser between a tap in the anode circuit of one of the said tubes and a control grid of the the other of the said tubes and a connection between a tap in the said anode circuit, and the circuit connection for feeding the second of two successive gating pulses to the second gating circuit.

15. In a system according to claim 1, means connected between the two gating circuits and the integrating circuit means for maintaining the voltage supplied by the integrating circuit means to the time modulator substantially constant when recurrent pulses do not pass the gating circuits and the second of two successive gating pulses is not lengthened, and third switching means for maintaining the said voltage substantially constant when recurrent pulses do not pass the gating circuits and the second of two successive gating pulses is lengthened, and a connection between the third and second switching means causing the third switching means to effect the said change when the second switching means is in one position for lengthening the second gating pulse.

16. In a system according to claim 1, means connected between the two gating circuits and the integrating circuit means for maintaining the voltage applied to the time modulator substantially constant when received recurrent pulses do not pass the gating circuits and the second of two successive gating pulses is not lengthened, and third switching means for feeding a constant voltage in series with the input to the integrating circuit means to cause the voltage provided by the integrating circuit means to remain substantially constant when recurrent pulses do not pass the gating circuits and the second of two successive gating pulses is lengthened, and a connection between the third and second switching means causing the third switching means to feed the constant voltage when the second switching means is in one position for lengthening the second of two successive gating pulses.

17. In a system according to claim 1, means connected between the two gating circuits and the integrating circuits for permanently adjusting electrode voltages for maintaining the control voltage supplied to the time modulator substantially constant when recurrent pulses do not pass the gating circuits and the second of two successive gating pulses is not lengthened, and third switching means for changing the said electrode voltage to cause the said control voltage to remain substantially constant when recurrent pulses do not pass the gating circuits and the second of two successive gating pulses is lengthened, and a connection between the third and second switching means causing the third switching means to change the electrode voltages when the second switching means is in one position for lengthening the second of two successive gating pulses.

18. In a system according to claim 1, including in the integrating circuit means a servomotor acting as integrator and controlled to run in the one or the other direction, an adjustable voltage divider applying its output voltage to the connection between the integrator circuit means and the time modulator and driven by the servomotor, means for permanently adjusting the circuit between the two gating circuits and the integrating circuit means for maintaining the voltage applied to the time modulator substantially constant when received recurrent pulses do not pass the gating circuits and the second of the two successive gating pulses is not lengthened, and third switching means for feeding a constant voltage in series with the input circuit of the integrating circuit means to cause the voltage provided by the integrating circuit means to remain substantially constant when recurrent pulses do not pass the gating circuit and the second of two successive gating pulses is lengthened, and a connection between the third and second switching means for causing the third switching means to feed the constant voltage when the second switching means is in one position for lengthening the second of two successive gating pulses.

References Cited in the file of this patent

UNITED STATES PATENTS

| | | |
|---|---|---|
| 2,467,208 | Hahn | Apr. 12, 1949 |
| 2,516,356 | Tull et al. | July 25, 1950 |
| 2,534,862 | Fox | Dec. 19, 1950 |
| 2,538,027 | Mozley et al. | Jan. 16, 1951 |
| 2,563,902 | Yost | Aug. 14, 1951 |
| 2,566,331 | Huber et a. | Sept. 4, 1951 |
| 2,617,093 | Fyler | Nov. 4, 1952 |
| 2,786,197 | Mozley | Mar. 19, 1957 |